J. J. WARD.
Bee-Hive.
No. 217,306.  Patented July 8, 1879.
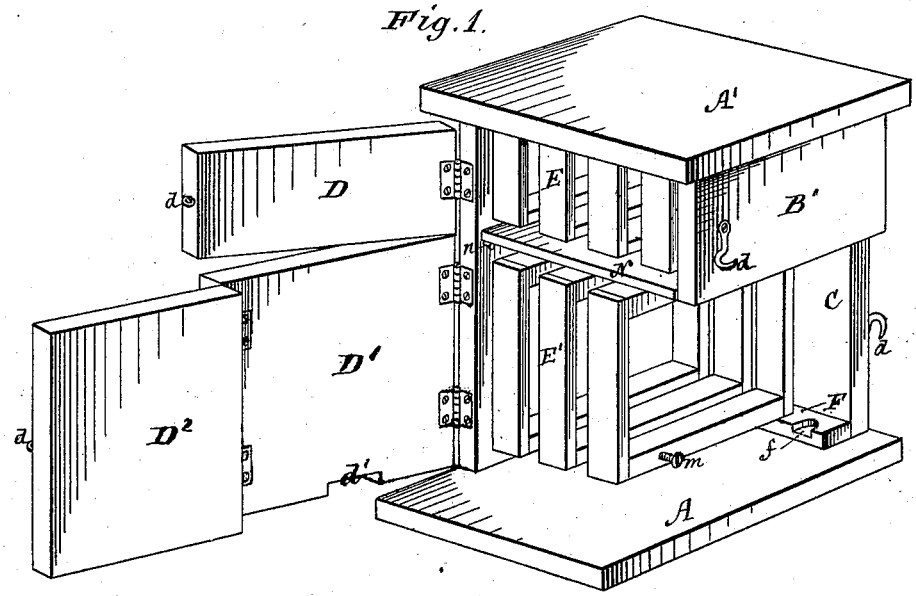
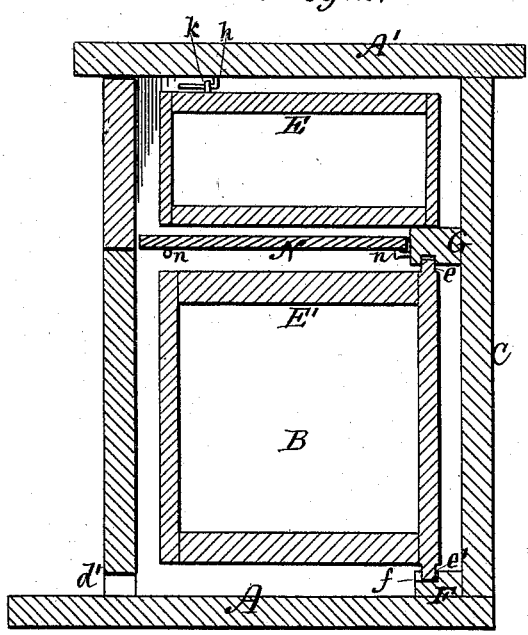
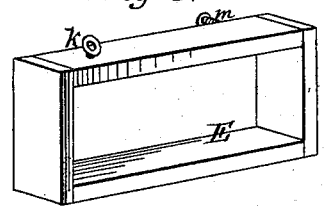
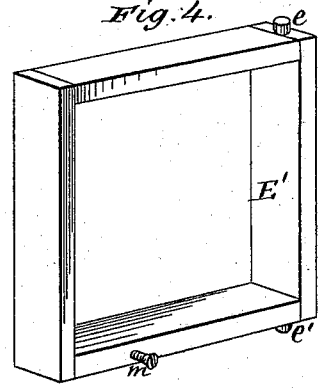
Witnesses:
W. B. Masson
W. E. Bowen
Inventor
John J. Ward
by E. E. Masson
atty

UNITED STATES PATENT OFFICE.

JOHN J. WARD, OF FORSYTH, ILLINOIS.

IMPROVEMENT IN BEE-HIVES.

Specification forming part of Letters Patent No. 217,306, dated July 8, 1879; application filed March 3, 1879.

*To all whom it may concern:*

Be it known that I, JOHN J. WARD, of Forsyth, in the county of Macon and State of Illinois, have invented certain new and useful Improvements in Bee-Hives; and I hereby declare that the following is a full, clear, and exact description of the same, reference being had to the accompanying drawings, making a part of this specification, in which—

Figure 1 represents a perspective view of the bee-hive with the front and one of the sides thereof open. Fig. 2 represents a longitudinal vertical section of the same. Fig. 3 represents one of the upper frames; and Fig. 4 represents one of the lower frames.

My invention relates to bee-hives having a series of upper and lower comb-frames.

Heretofore, in bee-hives of this class, to get at the contents the top of the hive has generally been removed and the upper comb bars or frames lifted from above; and if the lower comb-bars have also to be removed the operation becomes inconvenient, on account of the difficulty in reaching them from above.

Bee-hives have also been constructed with the comb-frames sliding into horizontal grooves and removed from the side or rear of the hive; but with this arrangement it is also difficult to remove said comb-bars, either from the swelling or warping of the wood or their adhesion with wax to their supports; moreover, the grooves furnishing to moths just the kind of hiding places they prefer. The upper frames have also been suspended on horizontal rods passing through grooves in said frames; but in these the last objectionable features are not removed.

The object of my invention is to provide a bee-hive that can be cheaply made and readily cleaned, to which access can at all times be easily had from the front of the hive for the removal of honey or to separate the upper from the lower chamber, and to provide a hive in which a swarm of bees may be readily placed without grooves to present a lodgment for moths and in which the frames may adhere.

My invention consists in combining with the frame of a bee-hive hooks attached to the top and a cleat attached to the rear side, as a support for two diagonal corners of the top frames, and the same cleat with a ledge having slots above the floor of the hive to support the lower frames, whereby each of the top and lower frames is supported only at two points, and is ready for removal clear of all connection with the frame of the hive by moving it forward a fraction of an inch.

This bee-hive is a rectangular box formed of a bottom board, A, and top, A', united by the side, B, and rear piece, C. The hive has an upper and lower compartment. The upper one is closed upon one side by the board B', and in front by a door, D, hinged to the side B. The lower compartment is closed in front by the door $D^1$, hinged also to the side B, and on one of its sides by another door, $D^2$, hinged to the door $D^1$. This door $D^1$ has an opening, $d'$, in its lower portion for the entrance of the bees. By this construction the whole interior can easily be examined and cleaned, and the comb-frames E and E' removed and replaced from the front of the hive, and the doors fastened by a hook and staple, $d$, or otherwise.

The construction of this hive is extremely simple, as the only addition to the shell of the frame is a ledge, F, on the bottom, A, as a support for the lower frames, and a cleat, G, to support the top frames at one of their corners, with the addition of hooks $h$ secured to the under side of the top, A', one for each frame, to pass through an eye, $k$, on top of said frames.

Each frame E' has cylindrical pintles $e$ $e'$ on top and bottom. The pintle $e$ is made to enter cylindrical holes in the under side of the cleat G, while the lower pintle, $e'$, enters a slot, $f$, in the ledge F. Each slot $f$ is cut only a short distance in the top of the ledge, so that the bottom of said slot is above the floor of the hive a sufficient distance to allow the pintle $e'$ and frame E' to drop below its normal level and release the upper pintle, $e$, when the lower end of the frame is pulled forward a fraction of an inch. The frames E and E' are kept at suitable distances apart by pins or screws $m$ entering in their sides, these screws being placed adjacent to the rear side in the top frames and adjacent to the front in the lower frames.

This hive is provided with a removable dividing-board, N, to cut off the communication between the lower or brooding compartment and the upper, called "surplus honey-chamber." This board N rests upon nails $n$, projecting in the interior from the sides of the hive, and as it is not fastened into grooves is easily removed through the open front. Thus it will be seen that all the parts within the hive can be removed without effort, or a portion of the frames only can be removed and replaced, if desired, without disturbing the other.

Having now fully described my invention, I claim—

1. With the outer frame of a hive having its whole front hinged to the sides, the combination of hooks $h$, attached to the top, A', with a cleat, G, attached to the rear, and comb-frames E, each provided with an eye, $k$, whereby each comb-frame is supported by two of its diagonal corners, substantially as and for the purpose set forth.

2. The combination of the frame of a beehive, having hooks $h$ and perforated cleat G, and frames E, supported at diagonal corners, with frames E', having pintles to engage with cleat G and ledge F, the latter being provided with slots above the floor of the hive, substantially as shown, and for the purpose described.

JOHN J. WARD.

Witnesses:
H. B. DURFEE,
E. A. JONES.